United States Patent [19]
Grillet

[11] Patent Number: 5,591,968
[45] Date of Patent: Jan. 7, 1997

[54] PHOTOSTIMULABLE IMAGING PLATE AND METHOD OF TESTING A DIGITAL DEVICE FOR SCANNING SUCH PLATE

[75] Inventor: Luc Grillet, Munich, Germany

[73] Assignee: Agfa-Gevaert AG, Munich, Germany

[21] Appl. No.: 505,790

[22] Filed: Jul. 21, 1995

[30] Foreign Application Priority Data

Sep. 19, 1994 [DE] Germany .................. 44 33 344.7

[51] Int. Cl.⁶ ............................................. G01N 23/04
[52] U.S. Cl. ................... 250/252.1; 250/484.4; 250/581; 250/584
[58] Field of Search .................. 250/252.1 R, 581, 250/582, 587, 484.4, 584–586

[56] References Cited

U.S. PATENT DOCUMENTS

| | | |
|---|---|---|
| 4,893,011 | 1/1990 | Bauer et al. . |
| 5,063,583 | 11/1991 | Galkin .................... 378/207 |
| 5,420,441 | 5/1995 | Newman et al. .......... 250/587 |

*Primary Examiner*—Carolyn E. Fields
*Attorney, Agent, or Firm*—Furgang & Milde, L.L.P.

[57] ABSTRACT

An image plate coated with a photostimulable element and a method of testing a digital device for scanning such plate with respect to various system parameters. A permanent and non-erasable test pattern (23) is applied to the plate for subsequent scanning by the device,

12 Claims, 3 Drawing Sheets

PHOTOSTIMULABLE IMAGING PLATE AND METHOD OF TESTING A DIGITAL DEVICE FOR SCANNING SUCH PLATE

BACKGROUND OF THE INVENTION

The present invention concerns a photostimulable phosphor-coated film and a method of testing a digital device for scanning such film with respect to various system parameters.

Digital apparatus is being increasingly employed in medical diagnostic radiography. Photostimulable imaging plates are being employed with increasing frequency instead of conventional X-ray film for X-ray imaging. One advantage of such an imaging plate over conventional film is its almost linear reproduction characteristic. An imaging plate is accordingly much more sensitive to too low or too high doses of radiation. Another advantage of imaging plates is that they can be used over and over; that is, images can be erased and others exposed onto the same plate. Still another advantage of an imaging plate is that it can be handled very much like conventional X-ray film. Accessories, such as cassettes for example, that are already employed for loading and unloading X-ray film can extensively be exploited to load imaging plates as well.

One method of handling photostimulable phosphor-coated film in X-ray cassettes is known, for example, from the published U.S. Pat. No. 4,893,011. In this case, an X-ray cassette is loaded with an imaging plate. Information relating to the particular image, such as patient name, date of birth, physician of record, etc., is entered in a semiconductor memory on the cassette at a data-entry station. The X-ray exposure is carried out and a latent image stored in the imaging plate. The cassette is then inserted in a reader wherein the cassette is opened and the plate is removed and stimulated with a digital scanning device. The light emitted by the stimulated elements, such as a phosphor or fluorine, is intercepted by a collector and converted into digital signals. The signals can then be processed in a digital processor.

The present invention concerns the scanning phase of the aforesaid procedure. Scanning involves scanning the pictorial information latent in the imaging plate point by point and converting it into digital picture signals. The plate is generally scanned by sweeping a laser over it line by line. Mechanical irregularities can lead to scanning error, and it is occasionally necessary to test the scanner. A lead "phantom" is usually employed to produce a phantom image on the plate through the cassette. The phantom image is then read and processed in the scanner.

One drawback to this method of testing is that the results depend not only on the digitization unit but also on certain other parameters that cannot be definitely identified or quantified, such as the quality of the phantom image, the quality and position of the imaging plate in the cassette, and the nature and position of the lead phantom in relation to the cassette.

SUMMARY OF THE INVENTION

The principal object of the present invention is accordingly to provide the simplest possible method and the simplest means of testing the various system parameters in a digital device for scanning photostimulable imaging plates that will produce reliable results.

This object, as well as other objects which will become apparent from the discussion that follows, are achieved, in accordance with the present invention, by providing an imaging plate with a permanent and non-erasable test pattern applied thereto. The test pattern is preferably transparent to X-rays and opaque to the scanning radiation that stimulates the phosphor or fluorine on the plate in a digital scanning device. Preferably, the test pattern is also opaque to the light emitted by the stimulated elements.

In accordance with the present invention, a photostimulable imaging plate of the aforesaid type is scanned by a digital scanning device which extracts and digitally stores the latent image on the plate. The test pattern permits the testing of the digital scanning device with respect to various parameters of the system. According to a preferred embodiment, a phantom image is generated on the plate by subjecting the film to X-rays which pass through a lead phantom pattern. The plate is then subsequently scanned by the digital scanning device and the results are compared to the scanning results obtained with a plate having a test pattern.

For a full understanding of the present invention, reference should now be made to the following detailed description of the preferred embodiments of the invention as illustrated in the accompanying drawings.

DESCRIPTION OF THE PREFERRED EMBODIMENTS

Figure 1:
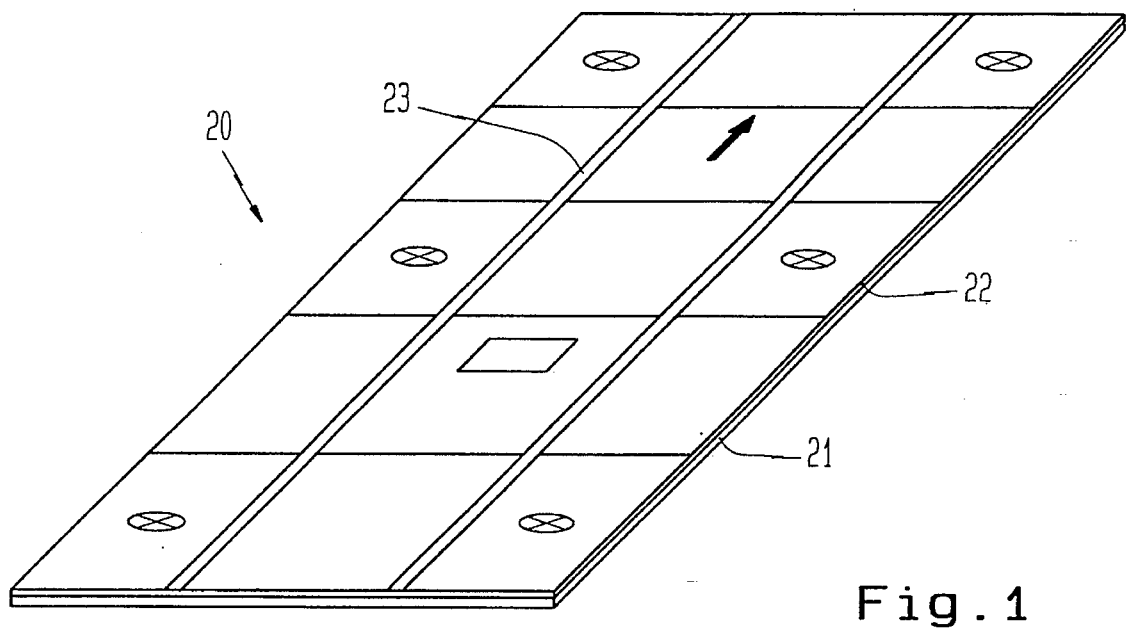
FIG. 1 illustrates an imaging plate coated with a photostimulable phosphor and having a test pattern applied thereto in accordance with the present invention.

The preferred embodiments of the present invention will now be described with reference to FIGS. 1–4 of the drawings. Identical elements in the various figures are designated with the same reference numerals.

Figure 2:
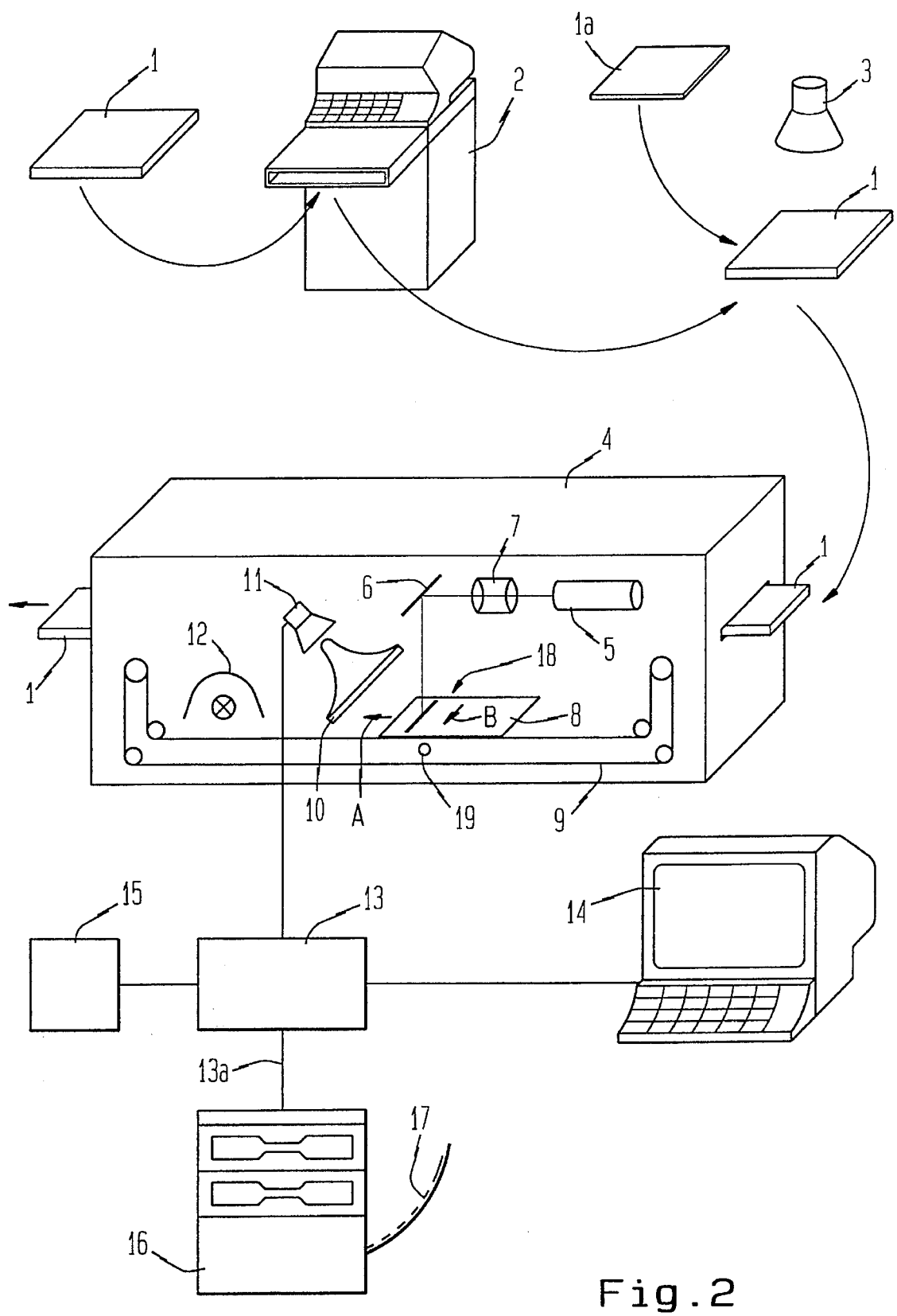
FIG. 2 is a device for testing photostimulable imaging plate of the type shown in FIG. 1.

FIG. 2 illustrates the testing equipment employed in digital radiography in accordance with the aforementioned U.S. Pat. No. 4,893,011 and available commercially from AGFA under the designation "ADC 70". As shown therein, an X-ray cassette 1 is loaded with a photostimulable imaging plate. Cassette 1 is inserted into a data-entry terminal 2, where information relating to the particular image, such as patient name, date of birth, physician of record, etc., is entered in a semiconductor memory on the cassette. The data can be transferred to the memory directly from a digital patient-data card. Desirable processing parameters can also be selected from menus on the terminal screen. Once the cassette has been accordingly initialized, the imaging plate is exposed to radiation from an X-ray tube 3. The resulting image will be latent and can only be read in a digital scanner 4. Cassette 1 is accordingly inserted into the scanner, wherein an unillustrated mechanism opens it and removes the plate 8. A plate conveyor 9 forwards the plate to a plate reader 18. The reader 18 includes a laser 5, a pivoting or rotating-prism mirror 6, an objective lens 7, a light conductor ("light pipe") 10, and a photoelectric multiplier 11. The laser 5 emits light to stimulate the phosphor on the imaging plate. The light can be infrared, red or green, depending on the type of phosphor. The light is focussed on the plate 8 by the lens 7. The moving mirror 6 reflects the beam onto the plate 8 line by line and point by point. The areas with the latent image emit light of stimulation. The light is intercepted by the light conductor 10 and forwarded to the photomultiplier 11. The multiplier amplifies the signals, transforms them into digital image signals, and forwards them to a central processing unit 13 that includes an image memory.

The plate 8 is conveyed for reading in a slow-scan direction A by a conveyor 9 while being scanned point by point in a rapid-scan direction B by the moving mirror 6.

Once the plate 8 has been scanned, it is erased by a downstream erasing component 12. The plate 8 is then loaded back into the same cassette 1, ready for the next exposure.

The image can be stored in a digital memory 15, displayed on a screen 14 for diagnosis, or released at a digital interface 13a to a hard-copy component 16, which issues it in the form of an image on photographic film 17. The picture data can also be forwarded to any other digital imaging system, as desired.

PIN diodes 19 in the reader 18 detect the insertion of a plate 8 into the reader. The diodes 19 intercept light from laser 5 until it is interrupted by the entering film.

The precision of the scanner 4 can be tested, as heretofore specified, by exposing a trial image of a lead phantom 1a. The phantom is positioned over or within the cassette 1 and the plate 8 is irradiated by the X-ray tube 3. The image is then digitized by the scanner 4 and processed in the central processing unit 13. The image is processed in accordance with the cassette's identifying information (region exposed & processing parameters).

FIG. 1 illustrates an imaging plate 20 in accordance with the present invention. It is a conventional imaging plate 21 which contains stimulable elements such as a phosphor or fluorine. A sheet 22 with a test pattern 23 printed on it is cemented to the imaging plate 21. The sheet 22 in the present embodiment is a 35 µm thick self-sticking sheet of AGFA Copyproof™ material. Test pattern 23 is printed photographically. The pattern itself is black and the rest of the sheet transparent. Although the pattern is transparent to X-rays, it is opaque to visible and infrared light. The test is conducted in a manner similar to the lead-phantom tests. A plate 20 with a test pattern 23 is loaded into an X-ray cassette 1 of an appropriate format and uniformly exposed to the X-rays. What is of advantage, in relation to conventional phantom images, however, is that the image will always be perfectly oriented with respect to the edges of the plate. The position of the plate in the cassette is accordingly insignificant with respect to the position of the test pattern on the plate. Once the image has been exposed, the cassette is inserted into the reader and the plate 20 is extracted from the cassette. The phosphor or fluorine is then stimulated and scanned, with the stimulating radiation being employed only to irradiate the test pattern. The radiation will be blocked by the black portions of the pattern, and the photoelectric multiplier 11 will accordingly receive no light from them. On the other hand, the radiation will pass through the transparent portions and will be intercepted by the photomultiplier.

The computer 13 associated with the photomultiplier has several programs available and can be instructed to calculate one or more of the following:

(1) geometrical scanning parameters such as scan width or length and row-or-column deviations from straight, (2) resolution parameters such as laser-spot size, and (3) artifacts of slow or rapid scanning such as jitter and wobble.

Processing with the appropriate software can be pixel-precise, with some areas of the test pattern displayed on the screen of a central computer that carries out statistical calculations.

Another program causes the test pattern to be imaged on photographic film by way of the hard-copy accessory device 16.

Figure 3:
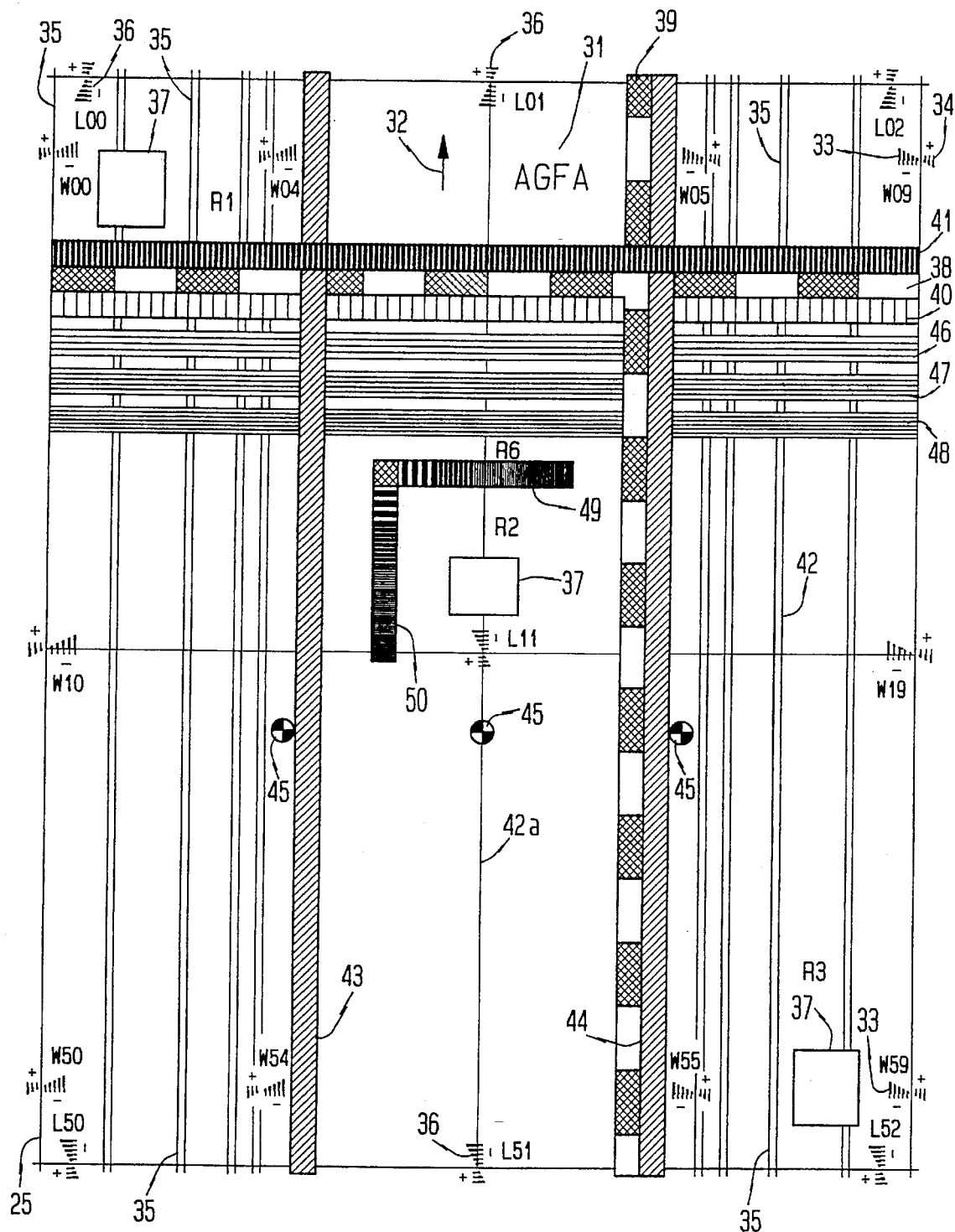
FIG. 3 is a sample imaging plate having a test pattern applied thereto in accordance with the present invention.

The various areas of the test pattern and their significance will now be specified with reference to FIG. 3. The plate with the test pattern is provided with an inscription field 31 containing a title or identification number. An arrow 32 indicates the direction (the slow-scanning direction) the plate travels along inside the reader. Registration marks 33 represent the widths associated with various formats. The marks are arranged in matrices and associated with a code $W_{n,m}$, whereby n is the row number and m the column number. Each width mark 33 includes graduations 34 that represent deviations from a prescribed width. A justification line 35 extends in the slow-scanning direction 32 through each width mark. The justification lines are 100 to 120 µm wide. Graduations 34 are 0.5 mm apart. The scanner's scanning width can accordingly be precisely determined down to at least 0.5 mm. A positive or negative scale extends out from the midpoint of the width marks 33, allowing very rapid determination of whether the effective scanning width is too large or too small.

The test pattern includes length marks 36 along with width marks 33. Length mark L01 represents the first line of the scale, the guiding edge of the imaging plate.

Three "Mire" patterns 37 of the type specified in German Industrial Standard (DIN) 19051, one at the upper left, one at the bottom right and one in the center, can be employed to demonstrate the scanner's resolution and laser-focus homogeneity. The justification of the optical elements and pixel-actuation capacity can also be tested. Mire patterns 37 are particularly effective in conjunction with grid lines 49 and 50, which are divided into ranges of 0.25, 0.5, 1, 2, 3, 4, and 5 pairs of lines per millimeter. Comparing the Mire measurement results with the grid line results will simplify troubleshooting in the event of geometric errors on the part of the scanner.

The reproduction of geometric shapes can also be tested using two bar patterns, specifically bar pattern 38 in the rapid scanning direction and bar pattern 39 in the slow scanning direction perpendicular thereto. The black bars (represented hatched) are each 1 cm wide. One bar parallels the rows and the other the columns. A ladder pattern 40 paralleling the lines and accordingly extending in the fast scanning direction, allows measurement of the linearity of the scanner at the edges of a scanning line.

The "rungs" of the ladder pattern are 200 µm wide and their frequency is 2 lines per centimeter. Spatial linearity along the rows can be measured using another frequency pattern 41 with a frequency of 0.5 pairs of lines per millimeter and paralleling the rows.

Of particular significance are justification lines 35 and 42, which extend over the total test pattern. Justification lines 35 and 42 can be employed to detect a slow scanning slanted position on the part of the imaging plate in the reader 18 illustrated in FIG. 2. Lines 35 and 42 parallel the edge of the film 20. Middle justification line 42a can also be employed to orient the imaging plate in the reader 18. Two gray areas 43 and 44 extending in the slow scanning direction and approximately 1 cm wide can be employed as simple means of detecting malfunctions in the slow scanning speed. Irregularities in the scanning speed express themselves in irregularly reproduced gray values in areas 43 and 44. The gray area 43 is printed with a raster of 175 dpi and the gray area 44 in a raster of 250 dpi.

The imaging plate in reader 18 can also be positioned using three justification circles 45. Each circle consists of four segments with opposite segments being either both white or both black. The center of each circle can accordingly be located with high precision even in a scanned image. Holes punched out of the center of each justification circle in the plate 20 allows a laser beam to pass onto PIN diodes 19 in the reader 18 in FIG. 2. As the plate is scanned in the reader, the signals emitted by the diodes unambiguously specify whether the plate is being correctly scanned. When the deflecting mirror is a pivoting mirror, it can be justified by differentially measuring the diodes' output with respect to time. In this event each diode will need to intercept three signals, one through each hole.

Figure 4:
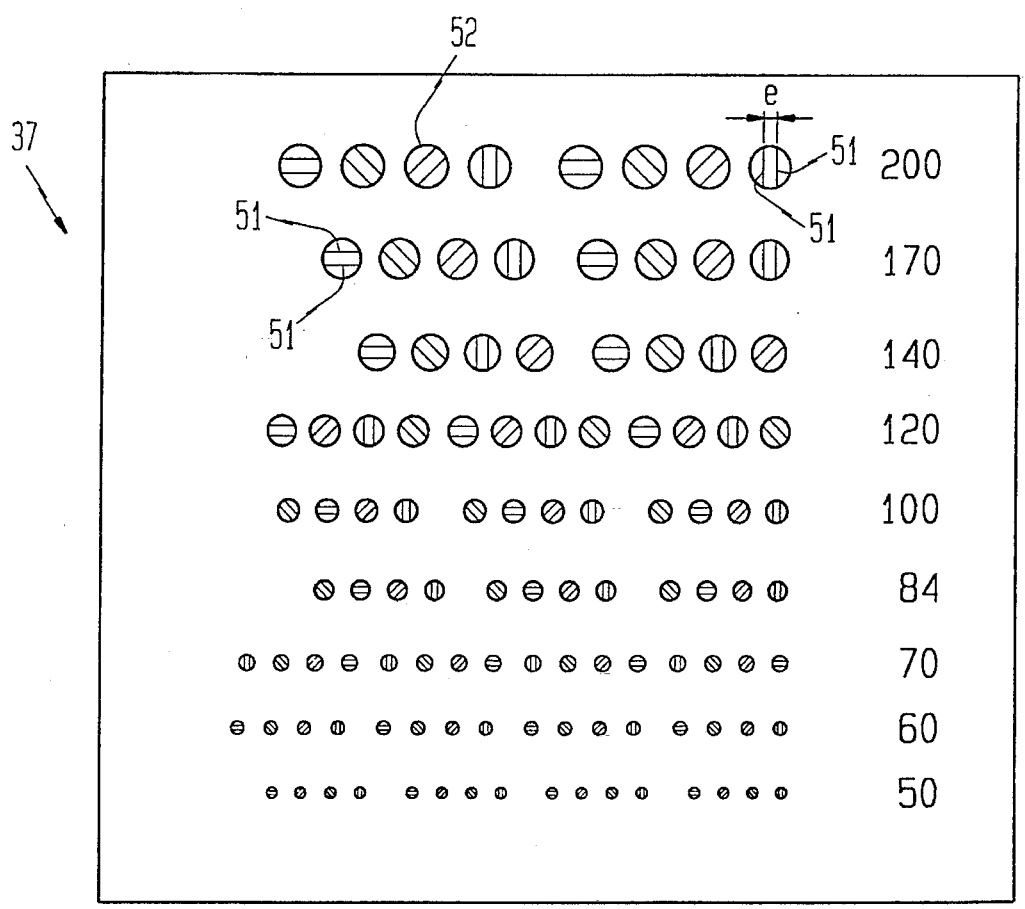
FIG. 4 is a detail of the test pattern shown in FIG. 3.

Jitter and wobble can be identified row-parallel with only three grid lines, specifically grid line 46 with three pairs of lines per millimeter, grid line 47 with four pairs, and grid line 48 with five pairs. Row-parallel jitter is expressed in the read-out image when Moiré patterns, specifically undulations, are perceptible along grid lines 46, 47, and 48. FIG. 4 is a larger-scale detail illustrating the Mire patterns 37 in the test pattern 23. They consist of a number of circles 52 or octagons. Inscribed in circles 52 at various angles to the direction A of the rows are lines 51. Lines 51 are 50 to 200 µm apart. The Mire patterns can be interpreted once the test pattern 23 has been scanned to determine the scanner's resolution and the homogeneity of the laser-beam focus.

Although the present invention has been specified in terms of just one embodiment by way of example, it is possible to expand the test pattern with additional elements in order to test other system parameters. It is possible, for example, to augment the imaging plate with additional characteristic geometric shapes known from television or micrographic applications. Test patterns can also be adapted from conventional phantom images.

Particularly predictive in relation to the present invention is a comparison of the test patterns in accordance with this invention with conventional phantom images. Such a comparison will allow exposure-dictated malfunctions—imaging plates aslant in the cassette for example—to be differentiated from reading-dictated malfunctions—plates aslant in the reader for example.

When the test pattern is printed on a sheet of transparent adhesive foil, it can very easily be cut to adapt it to smaller plate formats.

Alternatively to a storage phosphor plate, the plate for testing the scanning device can also comprise a non-stimulatable white or light reflecting surface onto which the test pattern is applied. The scanning can then be performed with light of any wavelength.

There has thus been shown and described a novel photostimulable imaging plate and method of testing a digital device for scanning such plate which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. In a method of testing a digital device for scanning a photostimulable imaging plate with respect to various system parameters of the scanning device, said scanning device being operable to scan the imaging plate with a beam of scanning radiation, the improvement wherein the digital scanning device scans a photostimulable imaging plate having a permanent and non-erasable test pattern applied thereto which is substantially transparent to X-rays but substantially opaque to the scanning radiation.

2. The method of testing a digital scanning device with respect to various system parameters as defined in claim 1, wherein a plate with a phantom image generated with a lead phantom pattern subjected to X-rays applied to it is also scanned and the results are compared with the scanning results obtained with said plate with a test pattern.

3. The method defined in claim 2, wherein the phantom image is produced in an X-ray cassette that accommodates a lead phantom.

4. In a photostimulable imaging plate for testing various system parameters of a digital scanning device which scans the imaging plate with a beam of scanning radiation, the improvement comprising a permanent and non-erasable test pattern applied to the plate which is substantially transparent to X-rays but substantially opaque to the scanning radiation.

5. The plate defined in claim 4, wherein the test pattern is opaque to the stimulated light emitted by a phosphor.

6. The plate defined in claim 4, wherein the test pattern comprises light-blocking material on a transparent sheet cemented to the imaging plate.

7. The plate defined in claim 4, wherein the test pattern comprises light-blocking material printed on the imaging plate.

8. The plate defined in claim 4, wherein the test pattern is opaque to visible light.

9. The plate defined in claim 4, wherein the test pattern is opaque to infrared radiation.

10. The plate defined claim 4, wherein the test pattern comprises at least one of:

(1) an arrow indicating the slow-scanning direction of the scanning device;

(2) a plurality of marks that represent various widths;

(3) a plurality of marks that represent various lengths;

(4) a plurality of lines of prescribed width, length, and direction;

(5) a plurality of patterns having bars of prescribed width and length, each pattern having a specific local frequency;

(6) at least one gray area; and (7) a plurality of circles for effecting justification.

11. The plate defined in claim 10, wherein the test pattern comprises at least of:

(1) an arrow indicating the slow-scanning direction of the scanning device;

(2) a plurality of marks that represent various widths;

(3) a plurality of marks that represent various lengths;

(4) a plurality of lines of prescribed width, length, and direction;

(5) a plurality of patterns having bars of prescribed width and length, each pattern having a specific local frequency;

(6) at least one gray area; and (7) a plurality of circles for effecting justification.

12. The plate defined in claim 10, wherein the test pattern comprises each of the following:

(1) an arrow indicating the slow-scanning direction of the scanning device;

(2) a plurality of marks that represent various widths;

(3) a plurality of marks that represent various lengths;

(4) a plurality of lines of prescribed width, length, and direction;

(5) a plurality of patterns having bars of prescribed width and length, each pattern having a specific local frequency;

(6) at least one gray area; and (7) a plurality of circles for effecting justification.

* * * * *

UNITED STATES PATENT AND TRADEMARK OFFICE
CERTIFICATE OF CORRECTION

PATENT NO. : 5,591,968
DATED : January 7, 1997
INVENTOR(S) : Luc Grillet

It is certified that error appears in the above-indentified patent and that said Letters Patent is hereby corrected as shown below:

Title Page, item: [73] Assignee: delete "Munich" and substitute -- Leverkusen --

Signed and Sealed this

Twenty-second Day of April, 1997

Attest:

BRUCE LEHMAN

*Commissioner of Patents and Trademarks*

Attesting Officer